United States Patent
Prasad et al.

(10) Patent No.: US 10,466,919 B2
(45) Date of Patent: Nov. 5, 2019

(54) INFORMATION HANDLING SYSTEM WITH ELASTIC CONFIGURATION POOLS IN FLASH DUAL IN-LINE MEMORY MODULES

(71) Applicant: DELL PRODUCTS, LP, Round Rock, TX (US)

(72) Inventors: Parmeshwr Prasad, Bangalore (IN); Viswanath Ponnuru, Bangalore (IN); Ravishankar Kanakapura Nanjundaswamy, Bangalore (IN)

(73) Assignee: Dell Products, LP, Round Rock, TX (US)

( * ) Notice: Subject to any disclaimer, the term of this patent is extended or adjusted under 35 U.S.C. 154(b) by 39 days.

(21) Appl. No.: 15/926,541

(22) Filed: Mar. 20, 2018

(65) Prior Publication Data
US 2019/0294352 A1    Sep. 26, 2019

(51) Int. Cl.
*G06F 3/06* (2006.01)
(52) U.S. Cl.
CPC .......... *G06F 3/0632* (2013.01); *G06F 3/0608* (2013.01); *G06F 3/0647* (2013.01); *G06F 3/0688* (2013.01)
(58) Field of Classification Search
CPC .... G06F 3/0607; G06F 3/0608; G06F 3/0631; G06F 3/0632; G06F 3/0647; G06F 3/0688; G06F 12/0246; G06F 12/0607
USPC ...................... 711/103, 157, 165; 713/1, 100
See application file for complete search history.

(56) References Cited

U.S. PATENT DOCUMENTS

| | | | |
|---|---|---|---|
| 5,428,758 A * | 6/1995 | Salsburg | G06F 12/0607 711/165 |
| 6,073,172 A | 6/2000 | Frailong et al. | |
| 9,817,754 B2 | 11/2017 | Kandasamy et al. | |
| 2009/0300299 A1* | 12/2009 | Saxe | G06F 12/0607 711/157 |
| 2010/0250876 A1* | 9/2010 | Wang | G06F 12/0607 711/157 |
| 2011/0302357 A1* | 12/2011 | Sullivan | G06F 13/409 711/103 |
| 2013/0003288 A1 | 1/2013 | Kanapathippillai et al. | |
| 2014/0095769 A1 | 4/2014 | Borkenhagen | |
| 2015/0205531 A1* | 7/2015 | DeMattio | G06F 3/0689 711/114 |

* cited by examiner

*Primary Examiner* — Gary J Portka
(74) *Attorney, Agent, or Firm* — Larson Newman, LLP (57) ABSTRACT

An information handling system includes multiple flash dual in-line memory modules (DIMMs) including first, second, and third flash DIMMs. The first and second flash DIMMs are configured as a first interleave set. A BIOS detects the third flash DIMM as a new flash DIMM during an initialization of the information handling system, and detects whether an auto-configure attribute is enabled. In response to the auto-configure attribute being enabled, the BIOS reads persistent memory data from the first interleave set, configures a second interleave set including the first, second, and third flash DIMMs, transfers the persistent memory data to the second interleave set without an external memory being utilized, and updates metadata for the second interleave set in response to the persistent memory data being transferred successfully.

20 Claims, 5 Drawing Sheets

INFORMATION HANDLING SYSTEM WITH ELASTIC CONFIGURATION POOLS IN FLASH DUAL IN-LINE MEMORY MODULES

FIELD OF THE DISCLOSURE

The present disclosure generally relates to information handling systems, and more particularly relates to an information handling system with elastic configuration pools in flash dual in-line memory modules.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes multiple flash dual in-line memory modules (DIMMs) including first, second, and third flash DIMMs. The first and second flash DIMMs may be configured as a first interleave set. A BIOS may detect the third flash DIMM as a new flash DIMM during an initialization of the information handling system, and may detect whether an auto-configure attribute is enabled. In response to the auto-configure attribute being enabled, the BIOS may read persistent memory data from the first interleave set, re-configure a second interleave set based on a number of flash DIMMs in the second interleave set, including the first, second, and third flash DIMMs, transfer the persistent memory data to the second interleave set without an external memory being utilized, and update metadata for the second interleave set in response to the persistent memory data being transferred successfully.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
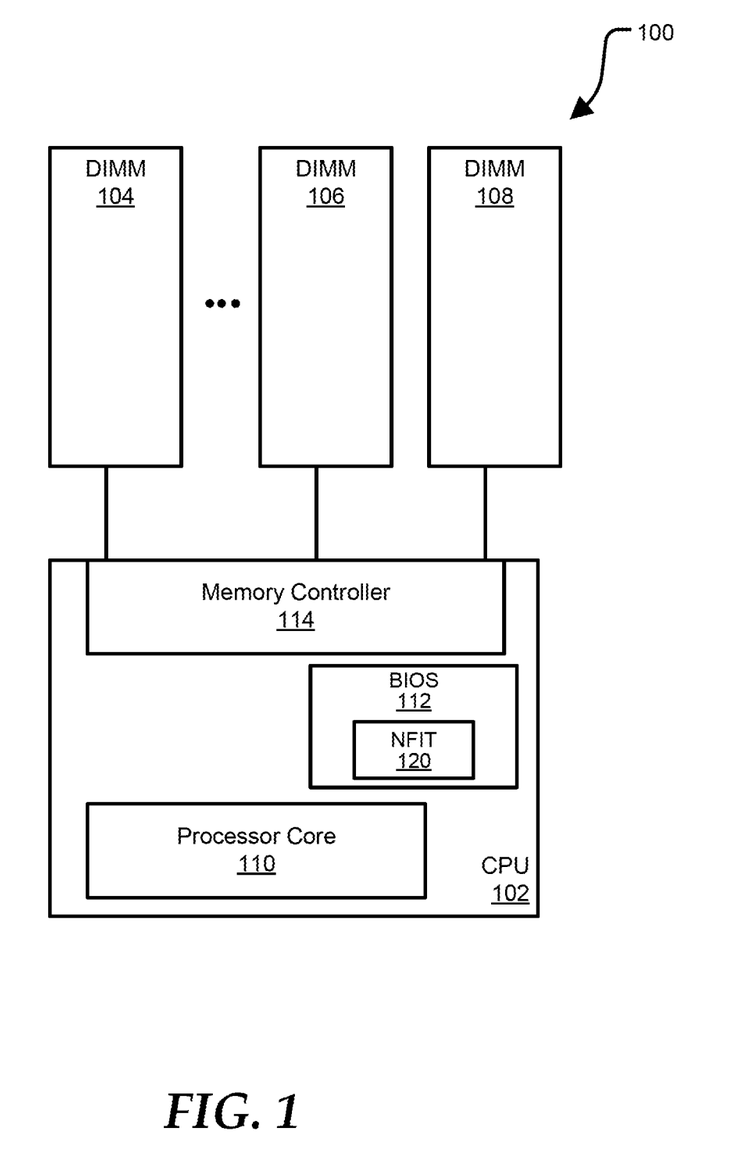
FIG. 1 is a block diagram of a portion of an information handling system according to at least one embodiment of the disclosure.

FIG. 1 shows an information handling system 100 including central processing unit (CPU) 102 and dual in-line memory modules (DIMMs) 104, 106, and 108. In an embodiment, the information handling system 102 can be a server, a personal computer, a laptop computer, or the like. The CPU 102 includes a processor core 110, a basic input/output system (BIOS) 112, and an operating system (OS) 114. The BIOS 112 includes a non-volatile dual in-line memory module (NVDIMM) firmware interface table (NFIT) 120. In an embodiment, the NFIT 120 can store information for the DIMMs 104, 106, and 108. In an embodiment, the DIMMs 104, 106, and 108 can include only persistent memory, such as flash memory, and will be referred to herein as flash DIMMs. For example, the DIMMs 104, 106, 108 may be Apache Pass (AEP) devices. One of ordinary skill in the art will recognize that while FIG. 1 illustrates DIMMs 104, 106, and 108, this disclosure is not limited to three DIMMs but can be applied to an N-way interleave set of DIMMs, as indicated by the ellipses in between DIMMs 104 and 106.

The central processing unit 102 may operate to provide data processing functionality of information handling system 100, such as is typically associated with an information handling system. As such, central processing unit 102 represents a data processing apparatus, such as one or more processor cores, and the associated data input and output (I/O) functionality, such as a chipset component, and other I/O processor components. The central processing unit 102 operates to execute machine-executable code to perform the data processing tasks associated with information handling system 100.

The memory controller 104 represents a portion of a processor complex that is dedicated to the management of the data storage and retrieval from the memory devices of information handling system 100, and information handling system 100 may include one or more additional memory controllers similar to the memory controller 104, as needed or desired. The memory controller 104 may reside on a system printed circuit board, may be integrated into an I/O processor component, may be integrated with a processor on a system-on-a-chip (SoC), or may be implemented in another way, as needed or desired. The memory controller 104 operates to provide data and control interfaces to one or more DIMM, such as flash DIMMs 104, 106, and 108, in accordance with a particular memory architecture. For example, the memory controller 104 and the flash DIMMs 104, 106, and 108 may operate in accordance with a Double-Data Rate (DDR) standard, such as a JEDEC DDR4 or DDR5 standard.

During operation, the flash DIMMs 104 and 106 can be previously assigned with processor core 110 and configured as an interleave set so that the flash DIMMs 104 and 106 operate as a single storage device for the CPU 102. As stated above, this disclosure is not limited to an interleave set of flash DIMMs 104 and 106, but can be applied to an N-way interleave set, as indicated by the ellipses in between flash DIMMs 104 and 106. However, for brevity and clarity the discussion herein will be described with respect to an interleave set with flash DIMMs 104 and 106. If a new memory device, such as flash DIMM 108, is added to the information handling system 100, then the flash DIMM 108 can be configured for use by the CPU 102 during the next basic input/output system (BIOS) initialization. In other embodiment, more than one flash DIMM can be added to the information handling system 100 without varying from the scope of this disclosure. In previous information handling systems, goal configuration changes are not allowed once one or more flash DIMMs are configured as an interleave set with goal configurations. Thus, during the BIOS initialization, an administrator of the information handling system 100 may either configure the new flash DIMM 108 as part of it's own interleave set, or re-configure all of the flash DIMMs 104, 106, and 108 to an interleave set. However, the re-configuring of all of the flash DIMMs 104, 106, and 108 will result in the loss of data on flash DIMMs 104 and 106. Thus, an improved elastic configuration pool process is described herein to enable a new flash DIMM, such as flash DIMM 108, to be added to an existing interleave set without losing the data of the existing interleave set.

During a BIOS initialization of the CPU 102, the BIOS 112 can detected that the new flash DIMM 108 has been added to the information handling system 100 via an interface with the memory controller 114. The BIOS 112 can then determine whether a goal configuration for the flash DIMMs exists. In an embodiment, the goal configuration can be a configuration of how the flash DIMMs 104, 106, and 108 are to be setup as an interleave set. The BIOS 112 can send flash DIMM mailbox commands to the flash DIMMs 104, 106, and 108 to read the goal configurations, and can check the existing goal configurations from a metadata region of the flash DIMMs 104, 106, and 108, or the like.

If the BIOS 112 does not detect a goal configuration for the flash DIMMs 104, 106, and 108 as a new interleave set, BIOS 112 can configure the flash DIMMs 104 and 106 based on the old flash DIMM configuration, such that flash DIMMs 104 and 106 are in the interleave set and flash DIMM 108 is not included in the interleave set. In an embodiment, the BIOS 112 configuring the flash DIMMs 104 and 106 can include setting persistent memory capacity of the flash DIMMs 104 and 106, setting volatile memory capacity of the flash DIMMs 104 and 106, or the like. In this situation, the BIOS 112 can retain the old configuration within the NFIT 120, and can log any errors that occurred during the attempted initialization of a new interleave set. The BIOS 112 can then move control of the flash DIMMs 104 and 106 to a DIMM driver of the memory controller 114.

If the BIOS 112 does detect a goal configuration for the new flash DIMMs does exist, a determination is made whether a BIOS attribute auto-configure is enabled. If auto-configure is not enabled, the BIOS 112 can configure flash DIMMs 104 and 106 as an interleave set based on the old goal configuration. However, if auto-configure is enabled, the BIOS 112 can then check population rules for the flash DIMMs 104, 106, and 108 within the goal configuration. If the population rules for the flash DIMMs are valid, the BIOS 112 can read the persistent memory data of the existing interleave set. The BIOS 112 can then determine whether a configuration change exists between a previous configuration a new configuration.

When there is a configuration change, the BIOS 112 can create metadata for persistent data read from the previous interleave set. In an embodiment, the metadata can include that the previous interleave included data within both flash DIMMs 104 and 106, can include what data needs to be copied to the new interleave set, or the like. The BIOS 112 can then re-configure the interleave set based on the number of flash DIMMs connected to the CPU 102, such as flash DIMMs 104, 106, and 108. The BIOS 112 can then automatically transfer the persistent data from the previous interleave set to the new interleave set using the created metadata. In an embodiment, the automatic transfer of the persistent data can be performed without using any external storage media, and without the initiation of the transfer by a user or administrator. In an embodiment, the term external storage media refers to any storage media other than the flash DIMMs of the interleave set, such as flash DIMMs 104, 106, and 108. If the BIOS 112 determines that the data transfer was not successful, such as the data was not properly copied, the BIOS 112 can delete the created metadata for the new interleave set, and can rollback the configuration of the flash DIMMs 104 and 106 to the previous interleave set. The flash DIMMs 104 and 106 can be restored to operation a the previous interleave set.

If the data transfer to the new interleave set was successful, the BIOS 112 can update the metadata for the new interleave set. In an embodiment, the update of the metadata can include updating goal configurations, updating labels for the flash DIMMs 104, 106, 108, updating namespaces on the flash DIMMs, creating new DPA ranges within the flash DIMMs 104, 106, 108, or the like. The BIOS 112 can also update the memory maps for the flash DIMMs 104, 106, and 108 from memory maps for the previous interleave set to memory maps including the new metadata for the new interleave set. The BIOS 112 can then complete the initialization of the flash DIMMs 104, 106, and 108 as the new interleave set, can initialize configurations for the flash DIMMs 104, 106, and 108 in the NFIT 120. Thus, the BIOS attribute of auto-configure for an new interleave set based on a new flash DIMM being added to the information handling system 100 can provide a mechanism within the BIOS 112 to enable seamless data transfers from the old interleave set to a new interleave set without using an external memory. Additionally, the auto-configure attribute of the BIOS 112 can provide advantages of enabling rollback strategies to the previous interleave set if the configuration of the flash DIMMs 104, 106, and 108 as a new interleave set fails.

Figure 2:
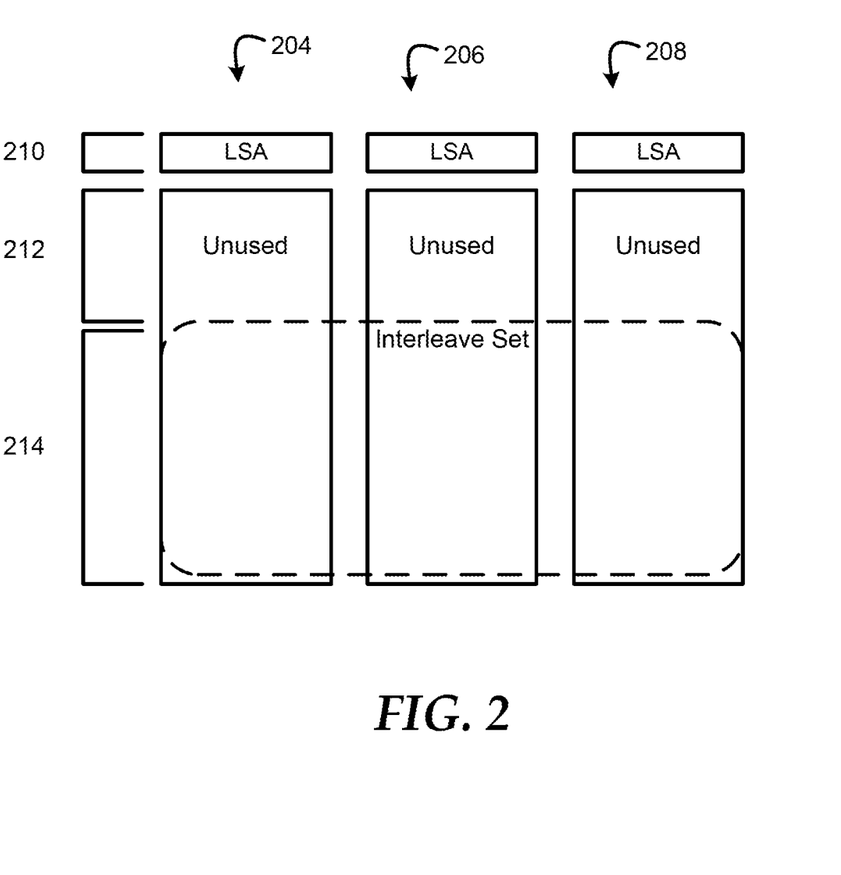
FIG. 2 is a diagram of multiple dual in-line memory module configured in an interleave set according to at least one embodiment of the disclosure.

FIG. 2 illustrates multiple flash DIMMs 204, 206, and 208 configured in an interleave set according to at least one embodiment of the disclosure. In an embodiment, the flash DIMMs 204, 206, and 208 can be the flash DIMMs 104, 106, and 108 of FIG. 1 after the flash DIMM 108 is added to the interleave set as described above. Each of the flash DIMMs 104, 106, and 108 include a label storage area (LSA) 210, an unused portion 212, and a persistent memory namespace portion 214.

The LSA 210 portion can be utilized to store configuration metadata offsets, corresponding DIMM physical address (DPA) ranges within the flash DIMM, or the like. During the creation of the new interleave set, data from the previous interleave set is transferred across the new interleave set of the persistent memory namespace portion 214 within the flash DIMMs 204, 206, and 208. Upon the data successfully being transferred, metadata, DPA addresses, or the like are updated within the LSA portion 214 of the flash DIMMs 204, 206, and 208 with respect to the flash DIMM configuration pools of the new interleave set. The NFIT for the new interleave set can be initialized with a BIOS of the information handling system.

Figure 3:
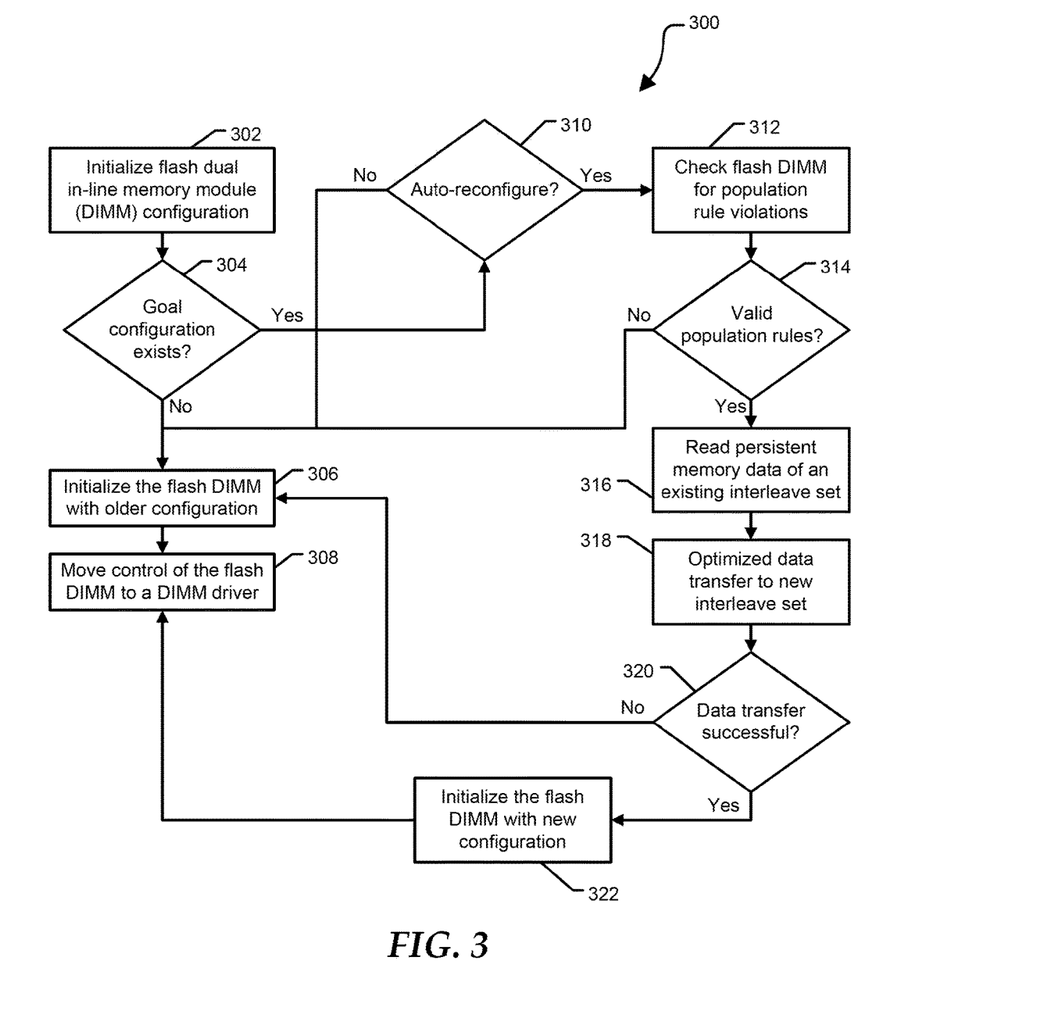
FIG. 3 is a flow diagram of a method for creating an elastic memory pool as a new flash dual in-line memory module is discovered during initialization of the information handling system according to at least one embodiment of the present disclosure.

FIG. 3 illustrates a flow diagram of a method 300 for creating an elastic memory pool as a new flash dual in-line memory module is discovered during initialization of the information handling system according to at least one embodiment of the present disclosure. At block 302, flash DIMMs within the information handling system are initialized and enumerated. In an embodiment, the initialization and enumeration of the flash DIMMs can be performed by a BIOS of the information handling system. At block 304, a determination is made whether a goal configuration for the flash DIMMs exist. In an embodiment, the BIOS can send flash DIMM mailbox commands to the flash DIMMs to read the goal configurations, and can check the existing goal configurations from a metadata region of the flash DIMMs.

If a goal configuration for the new flash DIMMs does not exist, the flash DIMMs are configured based on an old flash DIMM configuration at block 306. In an embodiment, configuring the flash DIMMs can include setting persistent memory capacity of the flash DIMMs, setting volatile memory capacity of the flash DIMMs, or the like. In an embodiment, the BIOS and NFIT initialization retain the old configuration and an errors determined during the initialization are logged. At block 308, control of the flash DIMMs is move to a DIMM driver, such as a driver of a memory controller in a CPU. If a goal configuration for the new flash DIMMs does exist, a determination is made whether a BIOS attribute auto-configure is enabled at block 310. If auto-configure is not enabled, the flow continues as stated above at block 306.

If auto-configure is enabled and an existing goal configuration is set, flash DIMM population rules within the goal configuration are checked for violations at block 312. In an embodiment, the population rules are for a new interleave set of the flash DIMMs. At block 314, a determination is made whether the population rules are valid. If the population rules are not valid, the flow continues as stated above at block 306. If the population rules are valid, persistent memory data of an existing interleave set is read at block 316. At block 318, data transfer of the persistent memory data of the existing interleave set to the new interleave set is optimized. At block 320, a determination is made whether the data transfer was successful. If the data transfer was not successful, the flow continues as stated above at block 306. If the data transfer was successful, the flash DIMMs are initialized with the new configuration at block 322. In an embodiment, the initialization of the flash DIMMs can include updating the flash DIMMs metadata and initializing NFIT configurations for the flash DIMMs in the BIOS.

Figure 4:
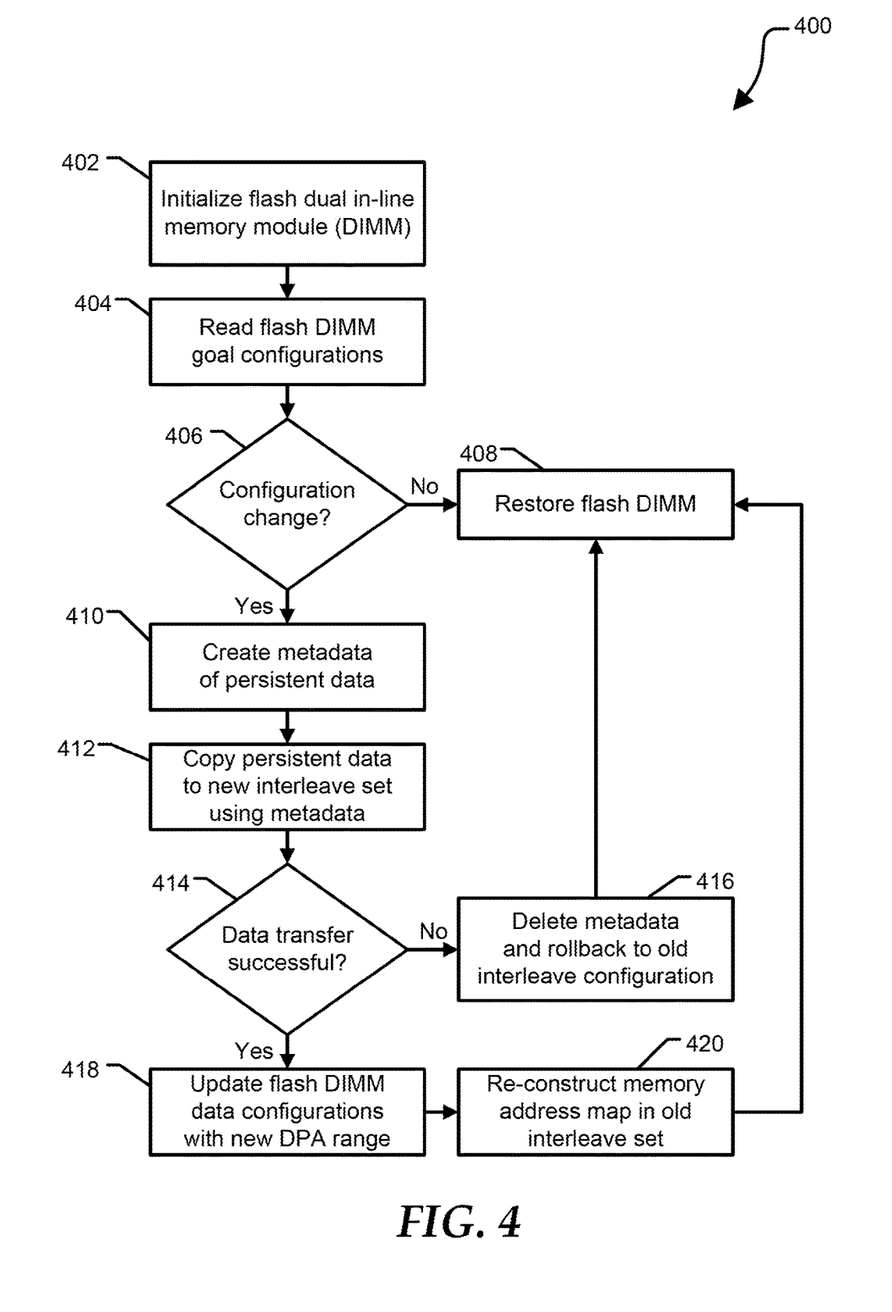
FIG. 4 is a flow diagram of a method for transferring data across the new interleave set according to at least one embodiment of the present disclosure.

FIG. 4 illustrates a flow diagram of a method 400 for transferring data across the new interleave set of flash DIMMs within an information handling system according to at least one embodiment of the present disclosure. At block 402, flash DIMMs are initialized. In an embodiment, a BIOS of a CPU within the information handling system. Flash DIMM goal configurations are read at block 404. At block 406, a determination is made whether a configuration change between a previous configuration a new configuration has been detected. If a configuration change is not detected, the flash DIMMs are restored to operation at block 408.

If a configuration change is detected, metadata for persistent data in a previous interleave set is created at block 410. In an embodiment, the metadata can include that the previous interleave included data within both flash DIMMs of the interleave set, can include what data needs to be copied to the new interleave set, or the like. At block 412, the persistent data from the previous interleave set is copied to the new interleave set using the created metadata. At block 414, a determination is made whether the data transfer was successful.

If the data transfer was not successful, the created metadata is deleted and the configuration is rolled back to the previous interleave set at block 416. The flow then continues at block 408 and the flash DIMMs are restored to operation at block 408. If the data transfer was successful, the metadata for the new interleave set is updated at block 418. In an embodiment, the update of the metadata can include updating goal configurations, updating labels for the flash DIMMs, updating namespaces on the flash DIMMs, creating new DPA ranges within the flash DIMMs, or the like. At block 420, the memory maps from the previous interleave set are re-constructed with the new metadata, and the flash DIMMs are restored to operation at block 408.

Figure 5:
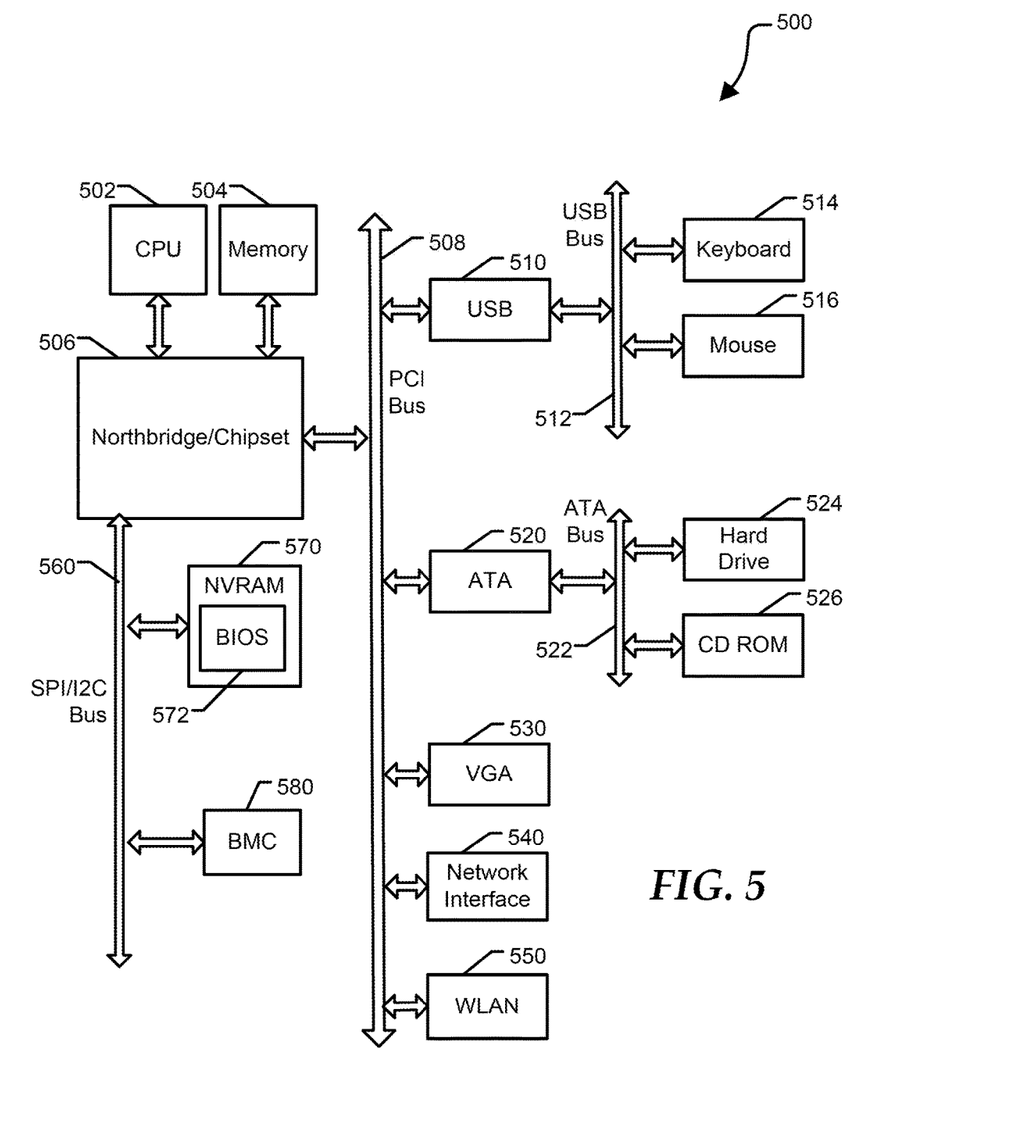
FIG. 5 is a block diagram of a general information handling system according to an embodiment of the present disclosure.

FIG. 5 illustrates a general information handling system 500 including a processor 502, a memory 504, a northbridge/chipset 506, a PCI bus 508, a universal serial bus (USB) controller 510, a USB 512, a keyboard device controller 514, a mouse device controller 516, a configuration an ATA bus controller 520, an ATA bus 522, a hard drive device controller 524, a compact disk read only memory (CD ROM) device controller 526, a video graphics array (VGA) device controller 530, a network interface controller (NIC) 540, a wireless local area network (WLAN) controller 550, a serial peripheral interface (SPI) bus 560, a NVRAM 570 for storing BIOS 572, and a baseboard management controller (BMC) 580. BMC 580 can be referred to as a service processor or embedded controller (EC). Capabilities and functions provided by BMC 580 can vary considerably based on the type of information handling system. For example, the term baseboard management system is often used to describe an embedded processor included at a server, while an embedded controller is more likely to be found in a consumer-level device. As disclosed herein, BMC 580 represents a processing device different from CPU 502, which provides various management functions for information handling system 500. For example, an embedded controller may be responsible for power management, cooling management, and the like. An embedded controller included at a data storage system can be referred to as a storage enclosure processor.

For purposes of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 500 can include processing resources for executing machine-executable code, such as CPU 502, a programmable logic array (PLA), an embedded device such as a System-on-a-Chip (SoC), or other control logic hardware. Information handling system 500 can also include one or more computer-readable medium for storing machine-executable code, such as software or data.

System 500 can include additional processors that are configured to provide localized or specific control functions, such as a battery management controller. Bus 560 can include one or more busses, including a SPI bus, an I2C bus, a system management bus (SMBUS), a power management bus (PMBUS), and the like. BMC 580 can be configured to provide out-of-band access to devices at information handling system 500. As used herein, out-of-band access herein refers to operations performed prior to execution of BIOS 572 by processor 502 to initialize operation of system 500.

BIOS 572 can be referred to as a firmware image, and the term BIOS is herein used interchangeably with the term firmware image, or simply firmware. BIOS 572 includes instructions executable by CPU 502 to initialize and test the hardware components of system 500, and to load a boot loader or an operating system (OS) from a mass storage device. BIOS 572 additionally provides an abstraction layer for the hardware, such as a consistent way for application programs and operating systems to interact with the keyboard, display, and other input/output devices. When power is first applied to information handling system 500, the system begins a sequence of initialization procedures. During the initialization sequence, also referred to as a boot sequence, components of system 500 are configured and enabled for operation, and device drivers can be installed. Device drivers provide an interface through which other components of the system 500 can communicate with a corresponding device.

Information handling system 500 can include additional components and additional busses, not shown for clarity. For example, system 500 can include multiple processor cores, audio devices, and the like. While a particular arrangement of bus technologies and interconnections is illustrated for the purpose of example, one of skill will appreciate that the techniques disclosed herein are applicable to other system architectures. System 500 can include multiple CPUs and redundant bus controllers. One or more components can be integrated together. For example, portions of northbridge/chipset 506 can be integrated within CPU 502. Additional components of information handling system 500 can include one or more storage devices that can store machine-executable code, one or more communications ports for communicating with external devices, and various input and output (I/O) devices, such as a keyboard, a mouse, and a video display. An example of information handling system 500 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 500 can include a set of instructions that can be executed to cause the information handling system to perform any one or more of the methods or computer based functions disclosed herein. The information handling system 500 may operate as a standalone device or may be connected to other computer systems or peripheral devices, such as by a network.

In a networked deployment, the information handling system 500 may operate in the capacity of a server or as a client user computer in a server-client user network environment, or as a peer computer system in a peer-to-peer (or distributed) network environment. The information handling system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single information handling system 500 is illustrated, the term "system" shall also be taken to include any collection of systems or sub-systems that individually or jointly execute a set, or multiple sets, of instructions to perform one or more computer functions.

The information handling system 500 can include a disk drive unit and may include a computer-readable medium, not shown in FIG. 5, in which one or more sets of instructions, such as software, can be embedded. Further, the instructions may embody one or more of the methods or logic as described herein. In a particular embodiment, the instructions may reside completely, or at least partially, within system memory 504 or another memory included at system 500, and/or within the processor 502 during execution by the information handling system 500. The system memory 504 and the processor 502 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a plurality of flash dual in-line memory modules including first, second, and third flash dual in-line memory modules, wherein the first and second flash dual in-line memory modules are configured as a first interleave set;
a central processing unit to communicate with the flash dual in-line memory modules; and
a basic input/output system of the central processing unit, the basic input/output system to detect the third flash dual in-line memory module as a new flash dual in-line memory module during an initialization of the information handling system, to detect whether an auto-configure attribute is enabled, and in response to the auto-configure attribute being enabled, the basic input/output system: to read persistent memory data from the first interleave set; to re-configure a second interleave set based on a number of flash dual in-line memory modules in the second interleave set including the first, second, and third flash dual in-line memory modules; to transfer the persistent memory data to the second interleave set without an external memory being utilized; and to update metadata for the second interleave set in response to the persistent memory data being transferred successfully.

2. The information handling system of claim 1, in response to the persistent memory data not being transferred successfully, the basic input/output system to rollback a configuration of the first interleave set and the third flash dual in-line memory module is not initialized.

3. The information handling system of claim 1, further comprising:
a memory controller to communicate with the flash dual in-line memory modules; and
the basic input/output system to move control of the first, second, and third flash dual in-line memory modules as the second interleave set to the memory controller in response to the second interleave set being initialized.

4. The information handling system of claim 1, the basic input/output system to check population rules of the second interleave set for violations prior to the persistent memory data being read.

5. The information handling system of claim 4, in response to a rule violation being detected, the basic input/output system to log errors associated with the rule violation, and to rollback the configuration of the first interleave set and the third flash dual in-line memory module is not initialized.

6. The information handling system of claim 1, the basic input/output system to update a dual in-line memory module firmware interface table with configuration information associated with the second interleave set.

7. A method comprising:
configuring first and second flash dual in-line memory modules as a first interleave set of an information handling system;
detecting, by a basic input/output system of the information handling system, a third flash dual in-line memory module as a new flash dual in-line memory module;
detecting whether an auto-configure attribute is enabled; and
in response to the auto-configure attribute being enabled:
reading, by the basic input/output system, persistent memory data from the first interleave set;
re-configuring a second interleave set based on a number of flash dual in-line memory modules in the second interleave set including the first, second, and third flash dual in-line memory modules;
transferring the persistent memory data to the second interleave set; and
updating metadata for the first, second, and third flash dual in-line memory modules in response to the persistent memory data being transferred successfully.

8. The method of claim 7, in response to the persistent memory data not being transferred successfully further comprising:
rolling back a configuration of the first interleave set and the third flash dual in-line memory module is not initialized.

9. The method of claim 7, further comprising:
moving control of the first, second, and third flash dual in-line memory modules as the second interleave set to the memory controller in response to the second interleave set being initialized.

10. The method of claim 7, further comprising:
checking population rules of the second interleave set for violations prior to the persistent memory data being read.

11. The method of claim 10, in response to a rule violation being detected further comprising:
logging errors associated with the rule violation; and
rolling back and configuring the first and second flash dual in-line memory modules as the first interleave set.

12. The method of claim 7, further comprising:
updating a dual in-line memory module firmware interface table with configuration information associated with the second interleave set.

13. The method of claim 7, wherein the basic input/output system completes the transfer of the persistent memory data from the first interleave set to the second interleave without an external memory being utilized.

14. The method of claim 7, wherein the detection of the third flash dual in-line memory module is during an initialization of the information handling system.

15. A method comprising:
configuring first and second flash dual in-line memory modules as a first interleave set of an information handling system;
detecting, by a basic input/output system of the information handling system, a third flash dual in-line memory module as a new flash dual in-line memory module;
reading goal configurations for the first, second, and third dual in-line memory module in response to detecting the third flash dual in-line memory modules;
creating metadata of persistent data of the first interleave set;
copying the persistent data of the first interleave set to a second interleave set based on the created metadata, wherein the second interleave set includes the first, second, and third flash dual in-line memory modules; and
updating metadata for the second interleave set in response to the persistent memory data being copied successfully.

16. The method of claim 15, in response to the persistent memory data not being transferred successfully further comprising:
rolling back a configuration of the first interleave set and the third flash dual in-line memory module is not initialized.

17. The method of claim 15, further comprising:
moving control of the first, second, and third flash dual in-line memory modules as the second interleave set to the memory controller in response to the second interleave set being initialized.

18. The method of claim 15, further comprising:
checking population rules of the second interleave set for violations prior to the persistent memory data being read.

19. The method of claim 18, in response to a rule violation being detected further comprising:
logging errors associated with the rule violation; and
rolling back and configuring the first and second flash dual in-line memory modules as the first interleave set.

20. The method of claim 15, wherein the basic input/output system completes the transfer of the persistent memory data from the first interleave set to the second interleave without an external memory being utilized.

* * * * *